XR 3,798,620

United States Patent [19]
Cosentino

[11] 3,798,620
[45] Mar. 19, 1974

[54] PAGE COMPOSER TRANSLATING INFORMATION FROM ELECTRICAL TO OPTICAL FORM

[75] Inventor: Louis Salvatore Cosentino, Belle Mead, N.J.
[73] Assignee: RCA Corporation, New York, N.Y.

[22] Filed: Dec. 7, 1972
[21] Appl. No.: 312,899

[52] U.S. Cl. ...... 340/173 LT, 350/3.5, 350/169 TV
[51] Int. Cl. ........ G11c 11/42
[58] Field of Search ........ 250/219 DQ, 219 R; 350/3.5, 169 TV

[56] References Cited
UNITED STATES PATENTS 3,614,192 10/1971 Preston ........ 350/3.5

*Primary Examiner*—Terrell W. Fears
*Attorney, Agent, or Firm*—Edward J. Norton; Carl V. Olson

[57] ABSTRACT

A page composer for translating binary information from electrical to optical form includes an insulating substrate having an array of electrodes on one surface thereof connected by feedthrough conductors to the opposite surface of the substrate. Means surrounding each electrode supports an elemental portion of a flexible reflective metallic membrane in spaced relation with a respective electrode. Semiconductor elements are positioned on the opposite surface of the substrate. Each element may be a MOS field effect transistor having a common ground connection to the metallic membrane, and an individual drain output electrode connected through a respective feedthrough conductor to a respective electrode on the other surface, whereby the portion of the flexible membrane opposite a terminal is planar or deformed depending on whether an electrical charge was supplied to the electrode by the respective transistor. When a readout light is directed to the exposed surface of the membrane, light is reflected from planar portions of the membrane to a utilization plane, and light is scattered from deformed portions of the membrane.

5 Claims, 7 Drawing Figures

3798620
OR IN 340/173LT

PAGE COMPOSER TRANSLATING INFORMATION FROM ELECTRICAL TO OPTICAL FORM

The invention herein described was made in the course of or under a contract or subcontract thereunder with the National Aeronautics and Space Administration.

BACKGROUND OF THE INVENTION

A computer memory system has been proposed which includes a randomly and electrically addressable semiconductor "page" memory. The semiconductor page memory may include a planar array of electrically accessible bistable circuits for storing a corresponding number of binary information bits. In addition, each bistable circuit is provided with a light valve controlled by the state of the bistable circuit. A laser light source, a light deflector and holographic optics are provided to create a hologram of the array of light valves at any one of many small areas on an erasable holographic storage medium. Subsequently, the hologram can be illuminated to recreate and project the image of the array of light valves onto an array of photosensors to return the information to an electrical form.

The device used to translate a page of binary information in electrical form to a corresponding optical page pattern for recording on an optical recording medium is called a "page composer". A page composer is an array of electrically controlled light sources, or light valves. Each light source or light valve may be controlled by a respective semiconductor circuit. Binary information is electrically written into the array of semiconductor circuits a word (a row) at a time in the usual manner of writing information into a semiconductor memory. The semiconductor circuits provide storage of the information written a word at a time until the entire array is filled with information. The semiconductor circuits may be flip-flops providing static storage.

It has been proposed that the light valves controlled by the bistable circuits be constructed using liquid crystals. It has also been proposed to use semiconductor materials which are normally transparent to light and which become opaque when heated by the passage therethrough of an electric current.

Ideally, a page composer should be fast, produce high contrast ratio at the detector, accept light over a large cone of angles, operate without fatigue or degradation over billions of cycles, and be efficient in utilization of the light impinging on it. In addition, it should be available in large enough sizes to accomodate large arrays. Candidates investigated suffer from one or more shortcomings in satisfying these requirements. For example, liquid crystals are slow, requiring several milliseconds at best, to relax. Most electro-optic crystals have very limited angles of acceptance, and large perfect pieces are difficult to produce. PZT ferroelectric ceramics are quite fast but fatigue effects have been found to severely limit operational lifetime.

SUMMARY OF THE INVENTION

According to an example of the invention, a page composer for translating binary information from electrical to optical form includes a flexible membrane supported on one side of a substrate in spaced relation with electrical terminals which are connected through the substrate to semiconductor bistable circuits on the other side of the substrate. Binary-information-representing portions of the membrane opposite corresponding terminals reflect or scatter a read-out light depending on the 1 or 0 electrical information present in corresponding semiconductor circuits.

DESCRIPTION OF THE PREFERRED EMBODIMENT

Figure 1:
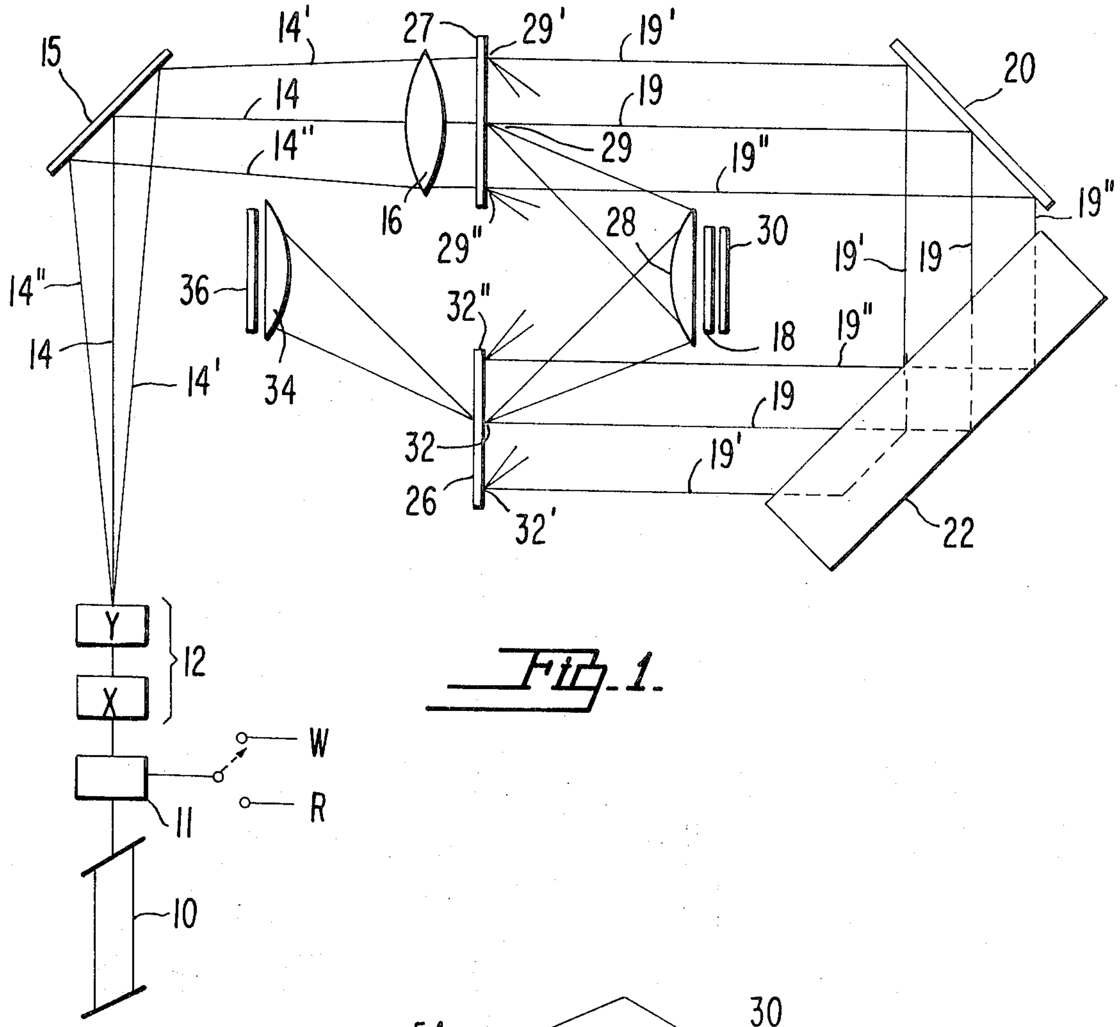
FIG. 1 is a diagram of a holographic memory system including a page composer.
Figure 2:
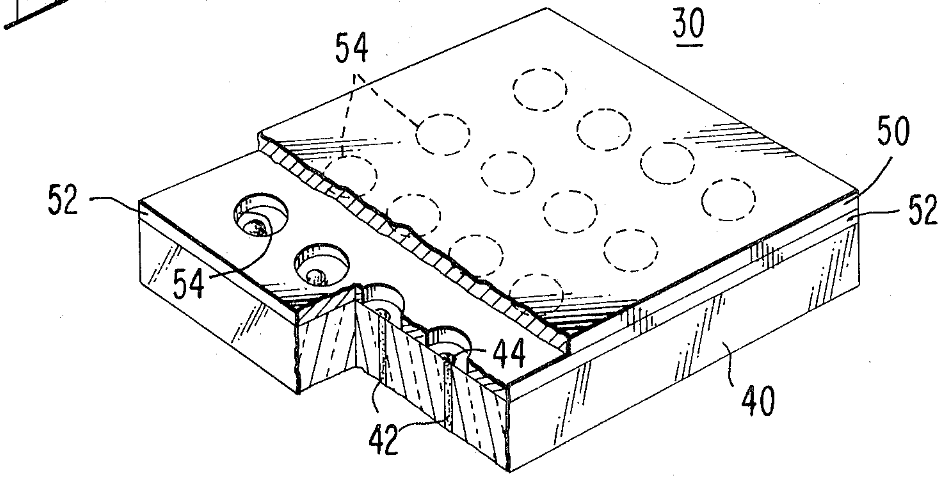
FIG. 2 is a perspective view, partly broken away, of a page composer useful in the system of FIG. 1.
Figure 3:
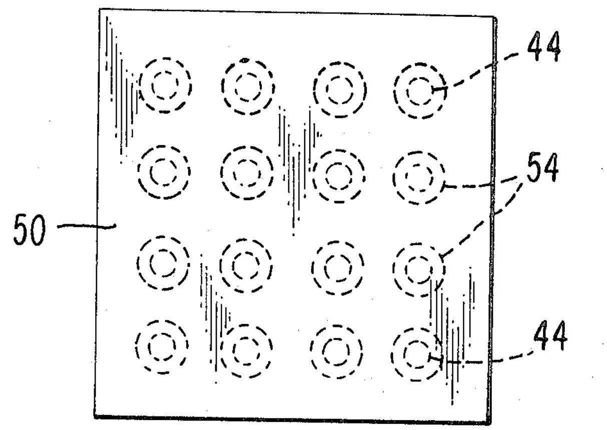
FIG. 3 is a view of one surface of a page composer constructed according to the teachings of the invention.

Referring now in greater detail to the drawing, the memory system shown in FIG. 1 includes a laser 10, a polarization rotator 11 and a beam deflector 12 including x-direction deflector X and y-direction deflector Y. The deflected light beam from the laser 10 may be along any one of the paths 14, 14', and 14'', or any intermediate path. The deflected beam, after being reflected by a pathfolding mirror 15, is directed through a collimating lens 16 from which the angularly deflected beams emerge in parallel relation to the optical path 14 of a central beam.

A light beam emerging from the collimating lens 16 is directed to a selected single illumination hologram 29 in an array 27 of illumination holograms. Each illumination hologram is constructed to diverge or spread out a received narrow beam to illuminate a page array 30 of binary memory units and may be a so-called "hololens" as described on page 1,383 of an article by Jan A. Rajchman entitled "Promise of Optical Memories" appearing at pages 1,376–1,383 of the March 1970 issue of the *Journal of Applied Physics*, *Supplement*. The portion of each of beams 14', 14 and 14'' which is undiffracted by the illumination hologram 27 continues on along a respective path 19', 19 and 19'' for use a a reference beam in creating a hologram on a holographic storage medium 26. Therefore, the illumination hologram not only illuminates the object 30, but also serves as a beam splitter for separating the laser beam into an object beam and a reference beam.

The diffracted object beam from the illumination hologram 27 is directed along an object beam path which includes a page lens 28, a polarizer 18 and a reflective-type page array 30 of memory units, from which light is reflected back through the polarizer 18 and page lens 28 to the storage medium 26. FIG. 1 shows the object beam path resulting from the impinging of the central beam 14 on a central illumination hologram 29 in the array 27. The central illumination hologram causes the beam to be spread out within a conical or pyramidal solid volume to the page lens 28 and page array 30 of memory units. The light reflected from the page array 30 is concentrated by page lens 28 so that it reaches a small area 32 on the holographic storage medium 26. Similarly, the laser beam when in the deflected position 14′ causes an object beam at 32′ on the storage medium 26. Likewise a laser beam at 14″ results in an object beam reaching the storage medium 26 at small area 32″.

The undiffracted portion of a light beam impinging on the illumination hologram 27 is reflected by a plane mirror 20 and a right angle prism or corner reflector 22 to the holographic storage medium 26. The central beam 14 follows reference beam path 19 to small area 32 on medium 26. Similarly, when the laser beam is deflected to positions 14′ and 14″, the reference beam follows path 19′ and 19″ to small areas 32′ and 32″, respectively.

The interfering effect of the object beam and the reference beam produces a hologram of the page composer 30 on the storage medium 26. To read out the holographically-stored information, the laser beam is given a read polarization in which the object beam is blocked by the polarizer 18, and the reference beam causes the stored image to pass through lens 34 and be reproduced on an array 36 of photosensors.

Reference is now made to FIGS. 2 through 7 for a detailed description of the page composer 30 included in the system of FIG. 1. The page composer shown for purposes of illustration, has a 4 × 4 array of light valves and associated semiconductor circuits. A substrate 40 may be of "Fotoform" or "Fotoceram" glass or ceramic material manufactured and sold by Corning Glass Co. These materials, in sheet form, can be exposed to ultraviolet light through photomasks, developed, and etched, to form holes extending through the sheet, and then heat-treated to form a tough ceramic-like substrate with the desired holes. The holes, in a 4 × 4 array, are filled with conductive material to form conductive feedthroughs 42 having enlarged electrodes 44 on the top surface of substrate 40.

A thin, flexible, reflective, metallic membrane 50 is supported in spaced relation with the top surface of substrate 40 by means of a support 52 having openings 54 surrounding the terminals 44 of feedthrough conductors 42. The openings 54 are shown as round, but they may, for example, be square. The openings 54, which define elemental deflectable portions of the membrane 50 may be 10 mils across or 10 mils square. The support 52 may be made of a metal such as aluminum, or a dielectric such as silicon monoxide, and may be about 1.25 microns thick. The membrane 50 carried on support 52 may be plated nickel about 4,000 A thick.

Figure 4:
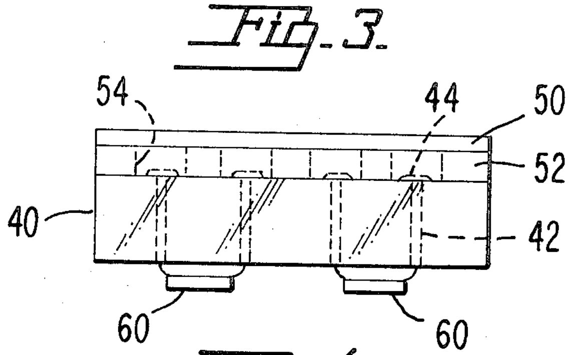
FIG. 4 is an edge view of the page composer of FIG. 3.
Figure 5:
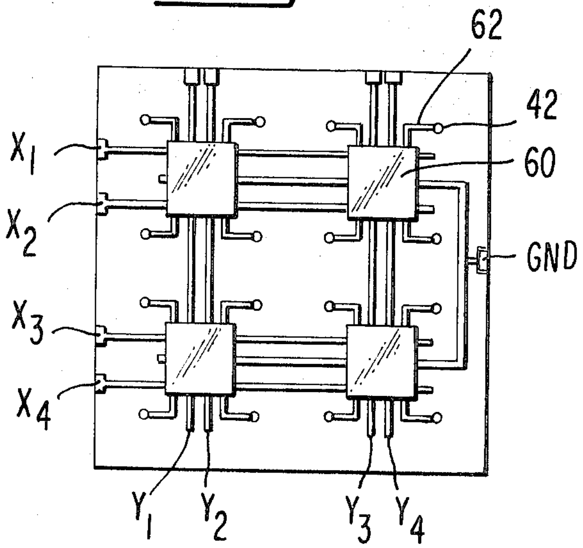
FIG. 5 is a view of the opposite surface of the page composer shown in FIGS. 3 and 4.
Figure 6:
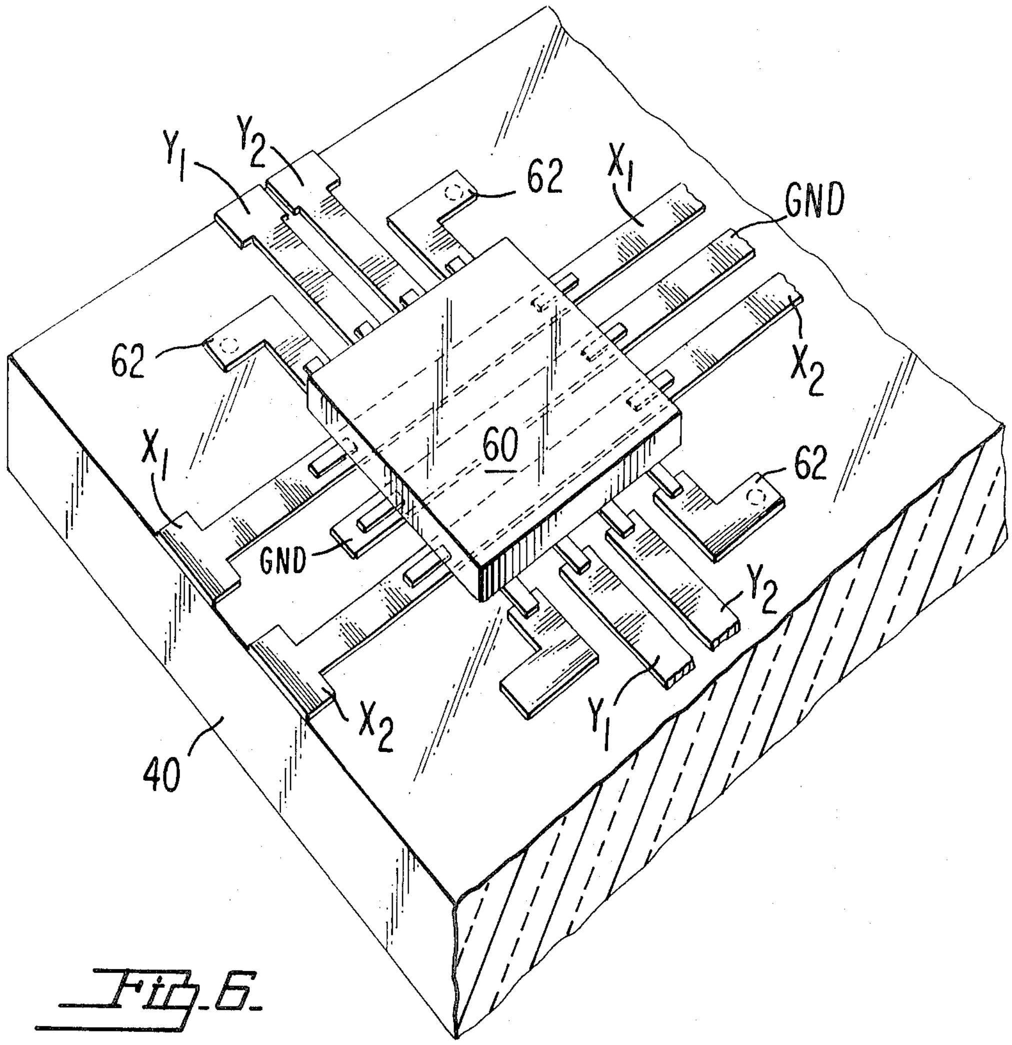
FIG. 6 is a perspective view of one of the semiconductor chips shown in FIG. 5.
Figure 7:
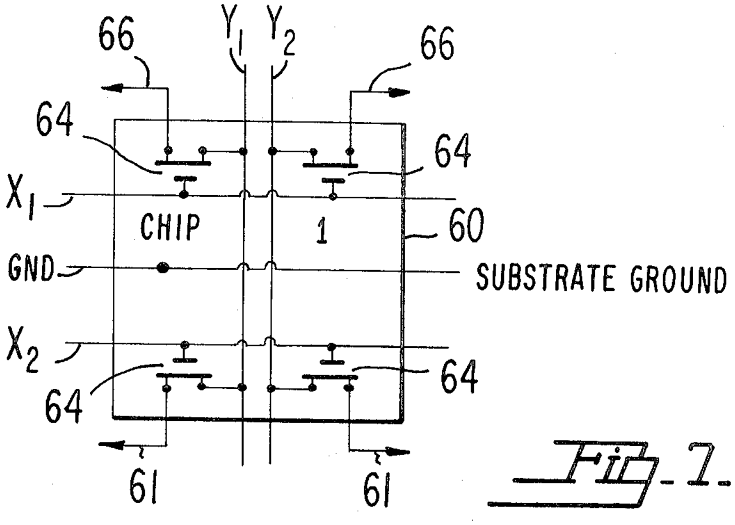
FIG. 7 is a schematic diagram of the circuit in the semiconductor chip shown in FIG. 6.

As shown in FIGS. 4 and 5, the opposite or bottom side of the substrate 40 has mounted thereon four semiconductor integrated circuit units 60. The bottom side of substrate 40 is provided with printed circuit conductors X1 through X4, and Y1 through Y4, and GND for electrically accessing the integrated circuits from external computer equipment (not shown). The substrate 40 is also provided with printed circuit conductors 62 (shown in FIG. 6) each connected with a respective one of the feedthrough conductors 42. Each integrated circuit unit 60 has beam leads connecting the circuits in the unit with the printed circuit conductors on the substrate.

The X and Y printed conductors on the substrate 40 do not cross each other, because the Y conductors are interrupted beneath the integrated circuit units 60. The printed conductors on the substrate are therefore advantageously in a single layer. A current path bridging the interrupted portions of the Y conductors are provided by conductors on or in the integrated circuit units, each conductor extending from a beam lead on one side of the unit to a beam lead on the opposite side of the unit. Each integrated circuit unit includes four semiconductor elements which may be bistable flip-flop circuits, but which preferably are MOS field effect transistors 64 having circuit connections as shown in the schematic diagram of FIG. 7. Each transistor has an output drain electrode 66 connected to a respective feedthrough conductor 42.

OPERATION

In the operation of the described page composer, binary information-bearing electrical signals are selectively applied to the X and Y conductors. Each MOS field effect transistor 24 at the intersection of an energized X conductor and an energized Y conductor is rendered conductive. One X word conductor at a time is energized to store a word of binary information. Selected ones of the Y digit conductors are energized to write 0 in the respective digit positions of the word. Unenergized digit positions represent 1.

The one energized X or word line connects an enabling voltage to the gate electrodes of all field effect transistors along the word line. Each energized Y or digit line connects a voltage to the source electrode of a respective field effect transistor along the word line. Since these transistors are enabled, the Y voltage is conducted through the transistor from the source electrode to the drain electrode and then through the respective feedthrough conductor 42 to the respective terminal 44. This causes an electrical charge to be stored in the capacitance formed by the electrode 44 and the opposite portion of the membrane 50. The electrical charge causes a deformation from planar of the adjacent elemental portion of the thin flexible membrane 50. A potential of about 30 volts may be sufficient to cause a desired deformation of the membrane.

After charges are established on the electrodes 44 along the accessed X or word line where 0s are to be stored, the field effect transistors along the word line are disabled and the charges remain on the electrodes 44 for an appreciable period of time until gradually discharged through leakage paths. In the meantime, another X or word line is enabled and binary information digits are supplied to the Y lines to store another word of information. This is repeated until the entire page compose contains stored information. Each MOS field effect transistor and the capacitance of the electrode and membrane cooperate to form a dynamic memory cell, as contrasted with a static memory cell. It may be necessary to refresh the stored information in a known manner if the stored information is not utilized before leakage path discharging of the capacitors occurs.

Once the desired binary information pattern is thus electrically established and stored in the illustrative 4 × 4 array of membrane elements constituting the page composer 30 in FIG. 1, light is directed, for example, from point 29 on hololens 27 to the page composer 30, and is selectively reflected thereby to area 32 on holographic recording medium 26. That is, light is reflected by membrane elements which are flat or planar (representing 1s) to the small area 32 on medium 26 which also receives a reference beam over path 19 from the hololens 27. The combined effect at area 32 of the reflected object light and the reference light is sufficient to create a hologram of the reflected light pattern in the storage medium 26. Light from deformed membrane elements (representing 0s) is so scattered and spread out that it has little effect on any part of the storage medium 26. In this way, the binary information electrically written into, and stored in, the semiconductor memory circuits is translated to an optical pattern of binary information which is optically transferred to and stored in the optical storage medium 26.

The page of binary information optically stored as a hologram at 32 on the recording medium 26 may be read out by directing a reference beam 19 to the hologram so that the stored information is reproduced at the array 36 of photosensors. The optically stored information is then translated back to electrical form. The contrast ratio, at the array of photosensors, of the light representing a 1 to the light representing a 0 may be 20 or more. Light representing a 1 was originally reflected to the storage medium from a planar membrane, and light representing a 0 was scattered by a deformed membrane. Of course, the 1 and 0 designations of binary conditions in the system may be reversed.

What is claimed is:

1. A page composer for translating information from electrical to optical form, comprising an insulating substrate having an array of electrodes on one surface thereof connected by feedthrough conductors to the opposite surface of the substrate, a flexible reflective metallic membrane, means surrounding each said electrode to support an elemental portion of said membrane in spaced relation with a respective electrode, an array of semiconductor elements mounted on said opposite surface of the substrate and each having a common connection to said metallic membrane and an individual output terminal connected through a respective feedthrough conductor to a respective electrode on said one surface, whereby each semiconductor element may be energized to supply a voltage to the respective terminal so that the opposite portion of said flexible membrane is changed from planar to deformed, and means to direct a read-out light to the exposed surface of said membrane, whereby light is reflected from planar portions of the membrane to a utilization plane, and light is scattered from deformed portions of the membrane.

2. A page composer as defined in claim 1 wherein said array of semiconductor elements is an array of bistable circuits.

3. A page composer as defined in claim 2 wherein said bistable circuits are flip-flop circuits.

4. A page composer as defined in claim 1 wherein said array of semiconductor elements is an array of MOS field effect transistors.

5. A page composer as defined in claim 4 wherein each terminal and associated portion of said membrane are constructed to provide a capacitance which cooperates with the respective MOS field effect transistor to constitute a dynamic memory cell.

* * * * *